US007595493B2

(12) United States Patent
Okada et al.

(10) Patent No.: US 7,595,493 B2
(45) Date of Patent: Sep. 29, 2009

(54) RADIATION DETECTING APPARATUS, MANUFACTURING METHOD THEREOF, SCINTILLATOR PANEL AND RADIATION DETECTING SYSTEM

(75) Inventors: Satoshi Okada, Kanagawa-ken (JP); Yoshihiro Ogawa, Tokyo (JP); Masato Inoue, Saitama-ken (JP); Kazumi Nagano, Kanagawa-ken (JP); Shinichi Takeda, Kanagawa-ken (JP); Tomoyuki Tamura, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 11/199,201

(22) Filed: Aug. 9, 2005

(65) Prior Publication Data

US 2006/0033040 A1 Feb. 16, 2006

(30) Foreign Application Priority Data

Aug. 10, 2004 (JP) ............................. 2004-233420

(51) Int. Cl.
*G01T 1/20* (2006.01)

(52) U.S. Cl. .................................. 250/370.11; 250/367

(58) Field of Classification Search .............. 250/483.1, 250/370.11, 370.09, 367
See application file for complete search history.

(56) References Cited

U.S. PATENT DOCUMENTS 4,392,907 A 7/1983 Shirato et al. ............... 156/252
4,510,388 A * 4/1985 Yamazaki et al. ........ 250/484.4
4,624,867 A * 11/1986 Iijima et al. .............. 427/255.6
5,139,813 A 8/1992 Yira et al. ...................... 427/8
5,677,717 A 10/1997 Ohashi ........................ 347/69
6,120,902 A * 9/2000 Van Havenbergh et al. ....................... 428/423.1
6,197,399 B1 3/2001 Naito et al. ................ 428/64.1

(Continued)

FOREIGN PATENT DOCUMENTS

JP H03-173654 7/1991

(Continued)

OTHER PUBLICATIONS

"Parylene Coating System", Three Bond Technical News, Three Bond Co., Ltd., 1992, vol. 39, pp. 1-10 and its English Translation.

*Primary Examiner*—David P Porta
*Assistant Examiner*—David S Baker
(74) *Attorney, Agent, or Firm*—Fitzpatrick, Cella, Harper & Scinto

(57) ABSTRACT

A radiation detecting apparatus includes a sensor panel 100, a phosphor layer 111 formed on the sensor panel 100 to convert a radiation into light, and a phosphor protecting member 110 covering the phosphor layer 111 to adhere closely to the phosphor protecting member 110. The phosphor protecting member 110 includes a phosphor protecting layer 116 made of vapor deposition polymerization polyimide formed by vapor deposition polymerization, a reflecting layer 113 reflecting the light converted by the phosphor layer 111, and a protecting layer 117 made of vapor deposition polymerization polyurea formed by the vapor deposition polymerization. By such a configuration, a polymerization reaction of the phosphor protecting layer 116 is performed on the substrate. Thereby, the generation of by-products is suppressed to make it easy to acquire the uniformity of film quality. Consequently, the generation of a situation in which structural disorders are generated on the reflection surface of the reflecting layer 113 to cause image defects can be suppressed.

19 Claims, 7 Drawing Sheets

U.S. PATENT DOCUMENTS

| | | | | |
|---|---|---|---|---|
| 6,262,422 | B1 * | 7/2001 | Homme et al. | 250/370.11 |
| 6,501,089 | B1 * | 12/2002 | Kuwabara | 250/591 |
| 6,602,547 | B2 * | 8/2003 | Klinedinst et al. | 427/212 |
| 6,652,996 | B2 * | 11/2003 | Steklenski et al. | 428/690 |
| 2003/0038249 | A1 * | 2/2003 | Hackenschmied et al. | 250/484.4 |
| 2004/0164251 | A1 * | 8/2004 | Bergh et al. | 250/484.4 |
| 2004/0195514 | A1 * | 10/2004 | Nagano | 250/370.11 |
| 2005/0104009 | A1 * | 5/2005 | Maezawa et al. | 250/484.4 |
| 2006/0033031 | A1 | 2/2006 | Takeda et al. | 250/370.11 |
| 2006/0033032 | A1 | 2/2006 | Inoue et al. | 250/370.11 |
| 2008/0152788 | A1 * | 6/2008 | Nagano | 427/74 |
| 2009/0061555 | A1 * | 3/2009 | Nagano | 438/69 |

FOREIGN PATENT DOCUMENTS

| | | |
|---|---|---|
| JP | H04-283223 | 10/1992 |
| JP | H05-247456 | 9/1993 |
| JP | H07-101057 | 4/1995 |
| JP | H11-010879 | 1/1999 |
| JP | H11-328725 | 11/1999 |
| JP | 2004-037420 | 2/2004 |
| JP | 2004-061115 | 2/2004 |

* cited by examiner

RADIATION DETECTING APPARATUS, MANUFACTURING METHOD THEREOF, SCINTILLATOR PANEL AND RADIATION DETECTING SYSTEM

BACKGROUND OF THE INVENTION

1. Field of the Invention

The present invention generally relates to a radiation detecting apparatus, a manufacturing method thereof, a scintillator panel and a radiation detecting system which are used for a medical diagnostic device, a nondestructive inspection device and the like, and more particularly to a scintillator panel, a radiation detecting apparatus and a radiation detecting system which are used for X-ray radiographing and the like. Incidentally, in the present specification, the description is given on the basis of the supposition that the category of a radiation includes an electromagnetic wave such as an X-ray and a γ-ray.

2. Related Background Art

In recent years, the digitization of X-ray radiographing has been accelerated, and various radiation detecting apparatuses have been announced. Their systems are roughly divided into two types of a direct system and an indirect system. The direct system is a type which directly converts an X-ray into an electric signal, and reads the converted electric signal. The indirect system is a type which once converts an X-ray into visible light and then converts the converted visible light into an electric signal to read the converted electric signal.

FIG. 11 is a sectional view of a radiation detecting apparatus of the indirect system disclosed in U.S. Pat. No. 6,262,422. In the drawing, a photoelectric conversion unit (light receiving unit) is formed by two-dimensionally arranging a plurality of photoelectric conversion elements 102 on a substrate 101, and the upper parts of the photoelectric conversion elements 102 are protected by a sensor protecting layer 104. Wiring 103 extending from the photoelectric conversion elements 102 is connected to a bonding pad portion (electrode extracting portion) 106 (a unit including the substrate 101, the photoelectric conversion elements 102, the sensor protecting layer 104 and the wiring 103 is also called as a "sensor panel", a "photoelectric conversion panel" or the like).

On the sensor protecting layer 104, a phosphor layer 111 made of CsI:Tl of a columnar crystal is formed as a wavelength conversion body converting a radiation into the light which the photoelectric conversion elements 102 can sense. The humidity proof protection of the phosphor layer 111 from the exterior is implemented by a phosphor protecting layer 112 consisting of an organic film made of poly-para-xylylene (trademark name: Parylene) having a thickness of about 10 μm, a reflecting layer 113 made of aluminum, and a protecting layer 114 made of Parylene. The reflecting layer 113 made of aluminum is provided for reflecting the light proceeding to the opposite side of the photoelectric conversion unit from the phosphor layer 111 and for leading the reflected light to the photoelectric conversion unit. The reflecting layer 113 is in a thin film state having a thickness of a submicron level by a vapor deposition method or the like. A reference numeral 115 denotes a covering resin for preventing the exfoliation of the phosphor protecting layer 112.

The radiation detecting apparatus shown in FIG. 11 converts entering X-ray information into a two-dimensional digital image by the configuration described above as follows. That is, an X-ray entering the radiation detecting apparatus from the upper part of the drawing transmits the protecting layer 114, the reflecting layer 113 and the phosphor protecting layer 112, and is absorbed by the phosphor layer 111. After that, the light emitted from the phosphor layer 111 reaches the photoelectric conversion elements 102, and the electric signals converted by the photoelectric conversion elements 102 are read by a not shown external circuit through the wiring 103.

The above-mentioned material called as Parylene constituting the humidity proof protecting layer (composed of the phosphor protecting layer 112 and the protecting layer 114) on the phosphor layer 111 is stated in "Parylene coating system", Three Bond Technical News, Three Bond Co., Ltd., Sep. 23, 1992, vol. 39, pp. 1-10. Parylene can be acquired as follows. A raw material called as di-para-xylylene (dimer) is heated and sublimated under a low pressure, and then a para-xylylene radical gas in a state of being heated to about 600° C. to be thermally decomposed is introduced to the adherend. Thereby, polymeric para-xylylene having a molecular weight of about 500,000 is condensed and polymerized to be acquired as Parylene.

However, the Parylene used as the material of the phosphor protecting layer in the prior art radiation detecting apparatus mentioned above is very reactive in a para-xylylene radical gas state in which one kind of dimer is thermally decomposed. Consequently, reactions sometimes advance in a gaseous state depending on changes of the temperature and the pressure in the system, and the produced organic film may become a heterogeneous film or have generated projections owing to by-products on the surface thereof. Such states will roughen the reflection surface of the reflecting layer 113 formed in the upper part of the phosphor protecting layer 112, and image defects may be caused in the worst case.

In the view of the problems mentioned above, it is an object of the present invention to provide a radiation detecting apparatus including a phosphor protecting layer which does not make the reflection surface of a reflecting layer on a phosphor layer produce structural disorder, and being capable of suppressing the generation of image defects.

SUMMARY OF THE INVENTION

For solving the problems mentioned above, a radiation detecting apparatus according to the present invention includes a substrate, a phosphor layer formed on the substrate to convert a radiation into light, and a phosphor protecting layer covering the phosphor layer to adhere closely to the substrate, wherein the phosphor protecting layer is made of an organic film formed by vapor deposition polymerization.

A scintillator panel according to the present invention includes a supporting member, a phosphor layer formed on the supporting member to convert a radiation into light, and a phosphor protecting layer covering the phosphor layer to adhere closely to the supporting member, wherein the phosphor protecting layer is made of an organic film formed by vapor deposition polymerization.

A manufacturing method of a radiation detecting apparatus according to the present invention is a manufacturing method of a radiation detecting apparatus including a substrate, a phosphor layer formed on the substrate to convert a radiation into light, and a phosphor protecting layer covering the phosphor layer to adhere closely to the substrate, the method including the step of forming the phosphor protecting layer by a vapor deposition polymerization method so as to cover the phosphor layer and to adhere closely to the substrate.

According to the present invention, because the organic film formed by the vapor deposition polymerization is used as the phosphor protecting layer, the polymerization reaction of the organic film is performed by the vapor deposition polymerization on an attachment. Thereby, in comparison with Parylene formed by the radical polymerization of the prior art, the generation of by-products is suppressed and the uniformity of film quality can be easily acquired. Consequently, it is possible to greatly suppress the generation of the disadvantageous situation in which image defects are caused by the generation of structural disorders on the reflection surface of the reflecting layer owing to the formation of a heterogeneous film or the generation of by-product projections on the surface.

DETAILED DESCRIPTION OF THE PREFERRED EMBODIMENTS

With reference to the attached drawings, the best modes for implementing a radiation detecting apparatus, a manufacturing method thereof, a scintillator panel and a radiation detecting system according to the present invention are described below.

First Embodiment

A radiation detecting apparatus according to the present embodiment includes a substrate, a phosphor layer formed on the substrate to be made of CsI:Tl having a columnar crystal, the phosphor layer converting a radiation into light, and a phosphor protecting member containing a phosphor protecting layer covering the phosphor layer, the phosphor protecting member adhering closely to the substrate. The phosphor protecting member includes the phosphor protecting layer made of an organic film formed by vapor deposition polymerization, a reflecting layer reflecting light converted by the phosphor layer, and a protecting layer for protecting the reflecting layer.

Here, referring to FIGS. 1A to 1F, 2 and 3, the vapor deposition polymerization method of the organic film constituting the phosphor protecting layer is described.

The vapor deposition polymerization method is a method of vaporizing two monomers of a polymeric material acquired by a condensation polymerization reaction or by a polyaddition reaction simultaneously by a binary vapor deposition method to acquire a polymeric thin film by a polymerization reaction on a substrate. Because the amount of evaporation of each monomer can be independently controlled according to the sublimation temperature of each monomer in the method, it is possible to adjust the stoichiometric mixture ratio of a polymerized film to be optimum. Moreover, because the transportation of a monomer is performed by the same technique as that of the usual process of vacuum sublimation generation, the purity of a generated film is high, and the method does not include the processes of the addition, the removal, the recovery and the like of solvents (pollution-free). Consequently, it is known that a film with very little mixing of impurities can be obtained. That is, because the polymerization reaction is performed on the substrate, the generation of by-products is suppressed and the uniformity of film quality can be easily acquired in comparison with the radically polymerized film of the prior art.

As the combinations of two kinds of functional groups to be the two monomers to react in the vapor deposition polymerization method and the polymeric thin films (organic films) generated by the condensation polymerization or the polyaddition reaction of the two kinds of functional groups, the following ones shown in FIGS. 1A to 1F can be exemplified.

Figure 1A:
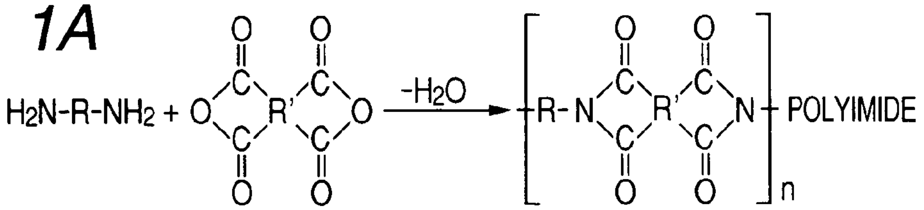
FIG. 1A is a view showing a vapor deposition polymerization reaction formula of polyimide.
Figure 1B:
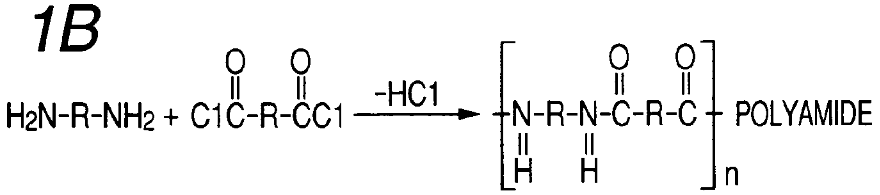
FIG. 1B is a view showing the vapor deposition polymerization reaction formula of polyamide.
Figure 1C:
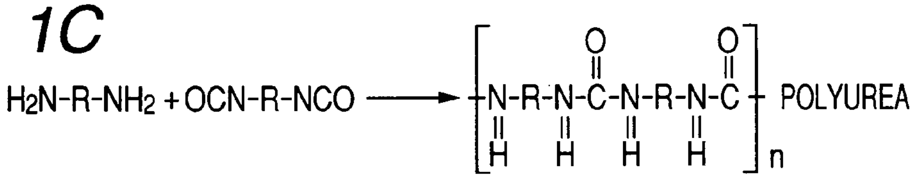
FIG. 1C is a view showing the vapor deposition polymerization reaction formula of polyurea.
Figure 1D:
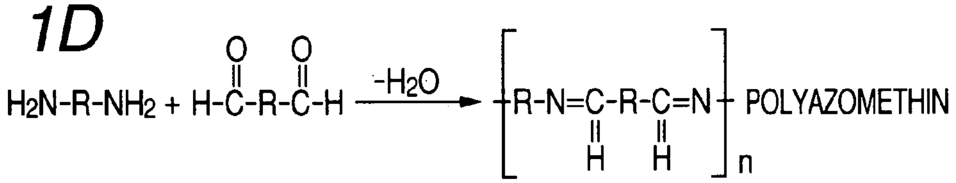
FIG. 1D is a view showing the vapor deposition polymerization reaction formula of polyazomethine.
Figure 1E:
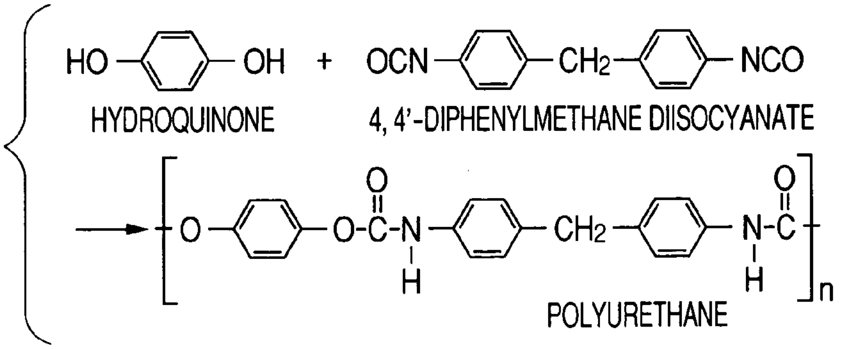
FIG. 1E is a view showing the vapor deposition polymerization reaction formula of polyurethane.
Figure 1F:
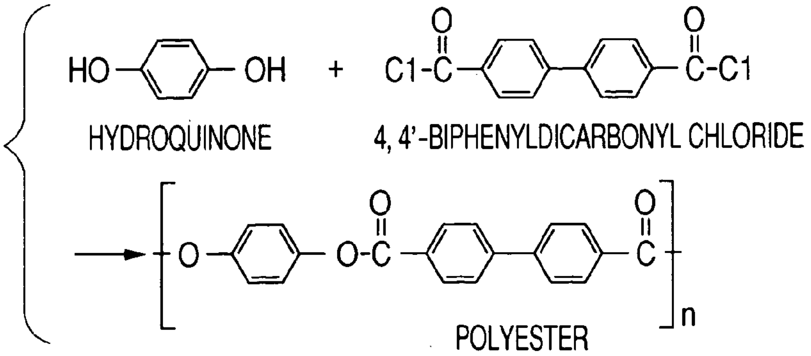
FIG. 1F is a view showing the vapor deposition polymerization reaction formula of polyester.

1) polyimide produced by the condensation polymerization reaction of a monomer diamine component and dianhydride (FIG. 1A), 2) polyamide produced by the condensation polymerization reaction of a monomer diamine component and acid dichloride (FIG. 1B), 3) polyurea produced by the polyaddition reaction of a monomer diamine component and diisocyanate (FIG. 1C), 4) polyamide-imide produced by the condensation polymerization reaction of a monomer diamine component and diisocyanate, 5) polyazomethine produced by the condensation polymerization reaction of a monomer diamine component and dialdehyde (FIG. 1D), 6) polyurethane produced by the polyaddition reaction of a hydroquinone component and diphenylmethane diisocyanate (FIG. 1E), 7) polyester produced by the condensation polymerization reaction of hydroquinone and biphenyl carbonyl chloride (FIG. 1F).

The production of various polymeric thin films is enabled using these functional groups by changing the combination of the functional groups and the backbone structures of monomer molecules.

Figure 2:
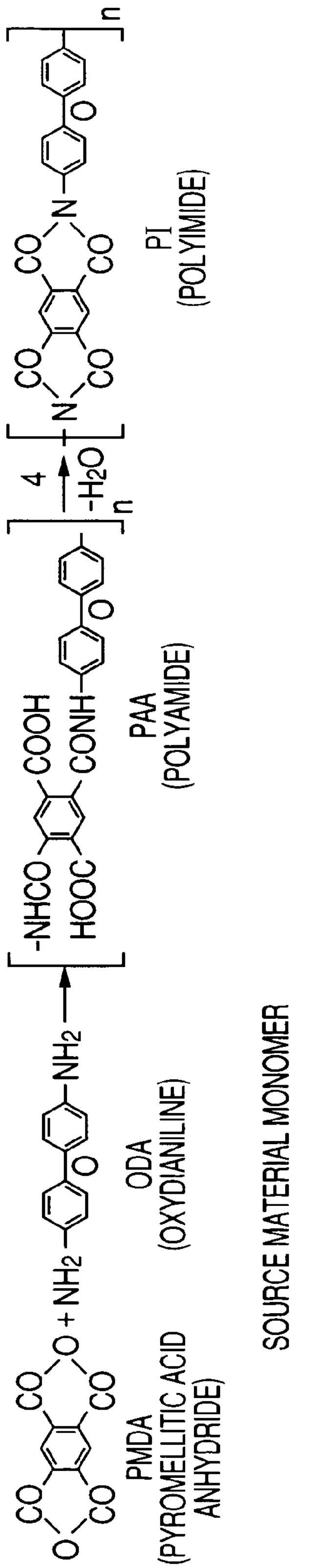
FIG. 2 is a view showing the reaction formula of vapor deposition polymerization polyimide.

For example, as shown in FIG. 2, polyimide can be produced by heating two monomers, i.e. oxydianiline (ODA), being monomer diamine component, and pyromellitic acid anhydride (PMDA), being dianhydride, under a vacuum to accomplish the coevaporation of them on the substrate and the dehydration cyclization reaction by the further heating (see, for example, non-patent document 3). In this case, the two monomers become polyamide acid, which is a precursor, in the stage of the vapor deposition at the substrate temperature of 200° C. or less, and the precursor is made to be imide by heating up to 200° C. or more. Because water is emitted in the process of a change to imide, it is important to fully lower the pressure in a vacuum chamber to perform the heating. The acquired film has a good coverage property to asperities and the like and an excellent heat resistance. Although an anneal process at 200° C. or more is needed for the activation of Tl in columnar structure phosphor such as CsI:Tl, if the anneal process is performed simultaneously with the process of changing the precursor into imide, it is also possible to reduce the independent anneal process. As the materials acquired by such a condensation polymerization reaction, polyamide, polyazomethine, polyester and the like can be exemplified in addition to polyimide.

Figure 3:
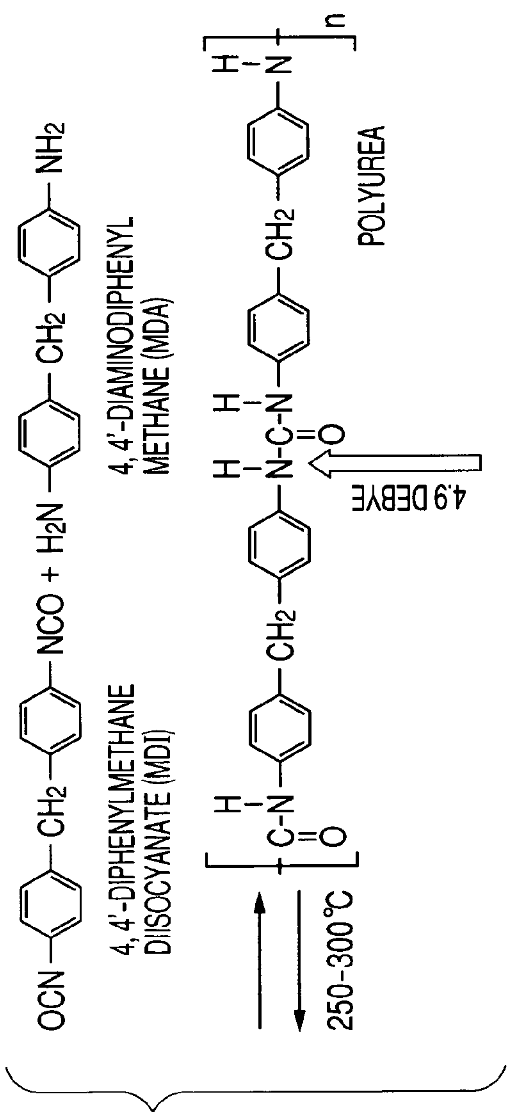
FIG. 3 is a view showing the reaction formula of vapor deposition polymerization polyurea.

On the other hand, as shown in FIG. 3, polyurea can be produced by heating two monomers severally, i.e. aromatic diamine (e.g. 4,4'-diaminodiphenyl methane (MDA)), being a monomer diamine component, and aromatic diisocyanate (e.g. 4,4'-diaminodiphenyl methane diisocyanate (MDI)), being diisocyanate, in a vacuum to vaporize them to accomplish the polyaddition reaction of them on the substrate (see, for example, non-patent document 5). Because the material can be formed as a film at a substrate temperature of a room temperature, the vapor deposition of the material can be performed independently of the kind of the adherend. Moreover, because the polyaddition reaction is preformed, excessive impurities are not produced, and especially it is possible to obtain the film on which projections owing to by-products are difficult to produce. Furthermore, because the material is insoluble to organic solvents owing to its highly crystallized property, when the material is used as the protection film of a phosphor, the protection film would have few image defects, and the reliability of the protection film could be improved. In addition to the material, as the material obtained by such a polyaddition reaction, polyurethane and the like can be exemplified.

Incidentally, because a dehydration reaction occurs in a film acquired by the condensation polymerization reaction and no dehydration reactions occur in a film acquired by the polyaddition reaction, the film acquired by polyaddition reaction (e.g. polyurea, polyurethane) is preferable as the phosphor protecting layer for protecting the phosphor layer of the columnar crystal structure having deliquescence in the present embodiment.

Figure 4:
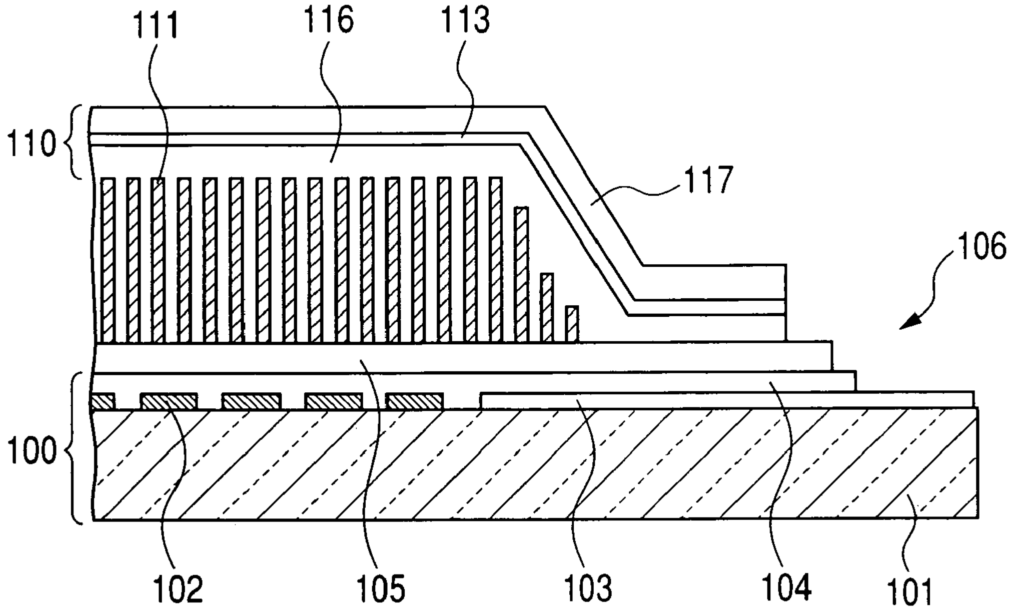
FIG. 4 is a sectional view showing a radiation detecting apparatus according to a first embodiment of the present invention.

FIG. 4 is a sectional view showing a preferable first embodiment. The present embodiment is one to which the indirect system radiation detecting apparatus mentioned above is applied.

The radiation detecting apparatus shown in FIG. 4 includes a sensor panel (photoelectric conversion panel) 100 which functions as a substrate, a phosphor layer 11 formed on the sensor panel 100 to convert a radiation to light sensible by photoelectric conversion elements 102, and a phosphor protecting member 110 including a phosphor protecting layer 116 covering the phosphor layer 111 to adhere closely to the sensor panel 100.

The sensor panel 100 includes an insulative substrate 101, a light receiving unit composed of a plurality of photoelectric conversion elements 102 two-dimensionally arranged on the substrate 101 to convert the light converted by the phosphor layer 111 into an electric signal, and a sensor protecting layer 104 protecting the light receiving unit. The wiring 103 extending from the photoelectric conversion elements 102 is connected to a bonding pad portion (electrode extracting portion) 106. On the sensor protecting layer 104, the phosphor layer 111 is formed with a passivation layer 105 put between the phosphor layer 111 and the sensor protecting layer 104.

The phosphor protecting member 110 is composed of the phosphor protecting layer (humidity proof protecting layer) 116 protecting the phosphor layer 111, the reflecting layer 113 made of a metal film such as aluminum to reflect the light converted by the phosphor layer 111, and a protecting layer (humidity proof protecting layer) 117 protecting the reflecting layer 113. The reflecting layer 113 is provided for reflecting the light proceeding to the opposite side of the light receiving unit from the phosphor layer 111 to lead the light to the light receiving unit. The reflecting layer 113 is formed in a thin film state with a thickness of a submicron level by the methods such as vapor deposition.

The phosphor layer 111 made of CsI:Tl of a columnar crystal structure, and the humidity proof protection of the phosphor layer 111 from the exterior is implemented by the phosphor protecting member 110 (composed of the phosphor protecting layer 116, the reflecting layer 113 and the protecting layer 117).

By the configuration mentioned above, in the radiation detecting apparatus of the present embodiment, an X-ray having entered from the upper part of the drawing transmits the protecting layer 117, the reflecting layer 113 and the phosphor protecting layer 116, and is absorbed by the phosphor layer 111. After that, the light emitted from the phosphor layer 111 reaches the photoelectric conversion elements 102, and electric signals generated by the photoelectric conversion elements 102 are read by a not shown external circuit through the wiring 103. Then, the entered X-ray information is converted into a two-dimensional digital image.

In the radiation detecting apparatus according to the present embodiment, vapor deposition polymerization polyimide formed by the vapor deposition polymerization is applied as the phosphor protecting layer 116 in the upper part of the phosphor layer 111, and vapor deposition polymerization polyurea formed by the vapor deposition polymerization is applied as the protecting layer 117 on the reflecting layer 113, respectively.

Next, the manufacturing method of the radiation detecting apparatus according to the present embodiment is described.

As a general process, columnar structure phosphor CsI:Tl used as the phosphor layer 111 is vapor-deposited. After that, the phosphor protecting layer 116 is formed through an anneal process at 200° C. or more for Tl activation. On the other hand, in the present embodiment, after the vapor deposition of the phosphor CsI:Tl having the columnar crystal structure has been performed, the processing of the present embodiment shifts to a vapor deposition polymerization process of a phosphor protecting layer as it is, without passing any anneal processes.

In the vapor deposition polymerization process of the phosphor protecting layer, two kinds of reactive groups (monomers) used as raw materials, i.e. a monomer diamine component and a dianhydride, are heated in a vacuum using the vapor deposition polymerization method of the polyimide used as the phosphor protecting layer mentioned above, and the reactive groups are coevaporated on the substrate. Then, a condensation polymerization reaction is performed on the substrate through a dehydration cyclization reaction by heating. By the processing, the vapor deposition polymerization polyimide which becomes the phosphor protecting layer 116 is produced on the phosphor layer 111. In addition to it, a change to be imide and the activation of Tl in CsI:Tl of the phosphor layer 111 are simultaneously realized at the time of the change to be imide by heating at 200° C. or more in the process. It becomes also possible to suppress the generation of the deliquescence of CsI:Tl in the anneal process. Moreover, in order to suppress the generation of the adhesion of the vapor deposition polymerization polyimide to the bonding pad portion 106, the vapor deposition polymerization polyimide is formed, with the bonding pad portion 106 being masked by a substrate holder or the like.

Successively, the thin film of aluminum which becomes the reflecting layer 113 is formed by a method such as a sputtering method. The bonding pad portion 106 is also masked in this process.

Subsequently, using the vapor deposition polymerization method of the polyurea mentioned above, the two kinds of reactive groups (monomers) used as the raw materials, i.e. a monomer diamine component and diisocyanate, are severally heated in a vacuum, and are vaporized. By the processing, the polyaddition reaction is performed on the substrate and the polyurea to be the protecting layer 117 is vapor-deposited on the reflecting layer 113. The bonding pad portion 106 is masked also in this case. Because the substrate temperature is a room temperature at this time, it is possible to suppress the generation of the damage to the aluminum thin film, or the reflecting layer 113.

According to the present embodiment, the vapor deposition polymerization polyimide formed by the condensation polymerization reaction is used as the phosphor protecting layer, and the vapor deposition polymerization polyurea formed by the polyaddition reaction is used as the protecting layer, respectively. Consequently, the polymerization reactions of the organic films are performed on the substrate by the vapor deposition polymerization, and thereby the generation of by-products is suppressed and the uniformity of the film quality can be easily acquired in comparison with the Parylen formed by the prior art radical polymerization. Consequently, it is possible to greatly suppress the generation of the disadvantageous situation such that heterogeneous films are formed or projections owing to by-products are produced on the surface so that structural disorders are caused on the reflection surface of the reflecting layer to cause image defects.

In addition, in the present embodiment, polyimide and polyurea are used as the phosphor protecting layer and the protecting layer, respectively. However, the present invention is not limited to the above-mentioned materials, but the same effects can be acquired by using two different organic materials selected from the group of combinations of the organic materials such as polyurea, polyimide, polyamide, polyamide-imide, polyazomethine, polyester and polyurethane. However, as the phosphor protecting layer, as described above, the layer acquired by the polyaddition reaction (for example, polyurea, polyurethane and the like) is more preferable than the layer acquired by the condensation polymerization reaction (for example, polyimide, polyamide, polyazomethine, polyester and the like) owing to the existence of the dehydration reaction.

Second Embodiment

Figure 5:
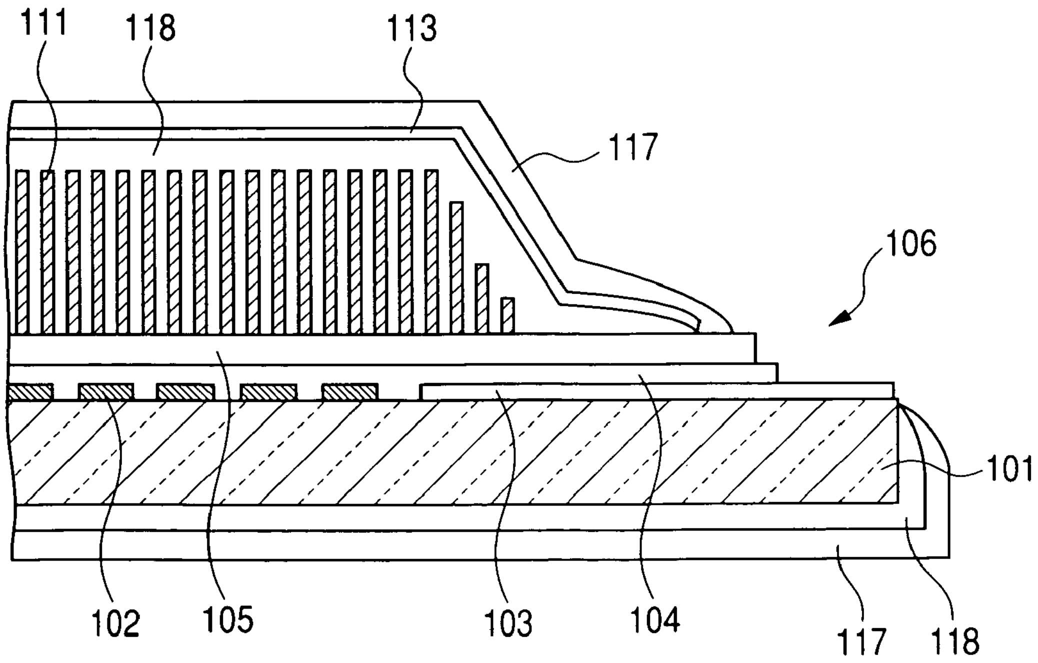
FIG. 5 is a sectional view showing a radiation detecting apparatus according to a second embodiment of the present invention.
Figure 6:
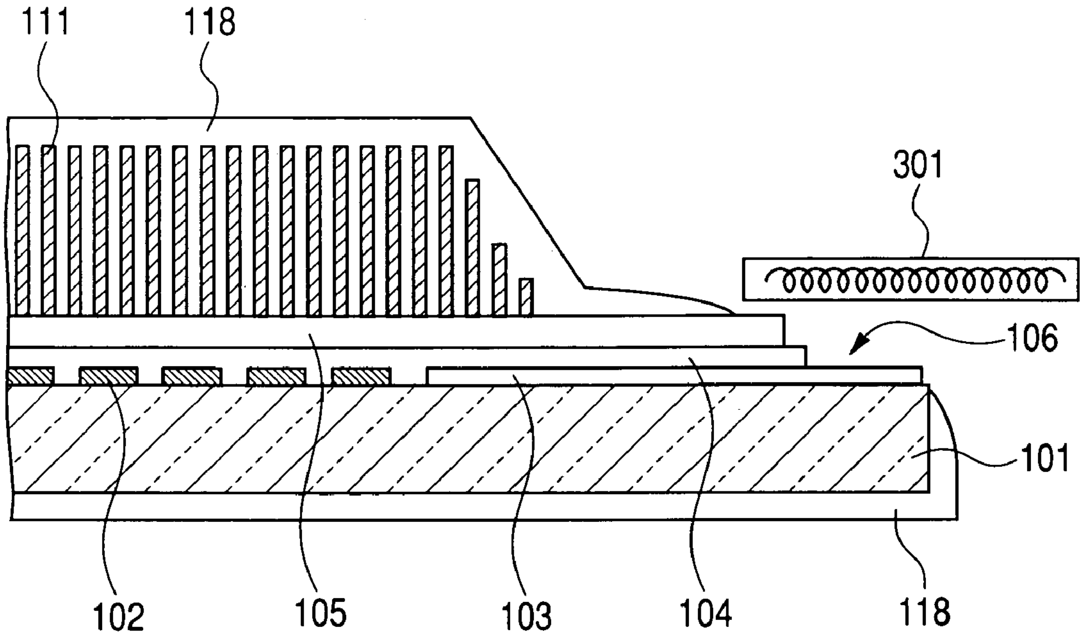
FIG. 6 is a sectional view illustrating the manufacturing process of the radiation detecting apparatus according to the second embodiment of the present invention.

FIGS. 5 and 6 are sectional views showing a second embodiment. Because the components corresponding to those of the first embodiment are denoted by the same reference numerals as those of the first embodiment, the descriptions pertaining to the same components are omitted.

In the present embodiment, as shown in FIG. 5, vapor deposition polymerization polyurea is applied as a phosphor protecting layer 118 at the upper part of the phosphor layer 111 made of CsI:Tl of a columnar crystal structure, and the vapor deposition polymerization polyurea is applied as the protecting layer 117 on the reflecting layer 113. Furthermore, the end faces of both the polyurea are formed to be thinner towards the outside. By such formation, a structure strong to the stress from the exterior at the formation end faces can be acquired. Moreover, both the polyurea are formed also on the surface of the sensor panel on the opposite side to the surface on which the phosphor layer is formed, and the end faces of the polyurea are formed to be thinner toward the outside similarly to the above. By such formation, a sensor panel structure functioning as a cushion material to the mechanical stresses from the outside to the back surface of the sensor panel, and having a strong shock resistance can be acquired.

Next, the manufacturing method of the radiation detecting apparatus according to the present embodiment is described.

First, by the same method as the prior art, the phosphor CsI:Tl which has a columnar crystal structure is formed, and annealing treatment thereof is carried out. Subsequently, the vapor deposition polymerization of polyurea is performed using the vapor deposition polymerization method of the polyurea mentioned above. At that time, as shown in FIG. 6, a heater (heating means) is brought close to a portion where the formation of the phosphor protecting layer is not wanted, such as the bonding pad portion 106, and the surface at that portion is heated. The vapor deposition of the polyurea to that portion is prevented by this processing. By the implementation, the risks of injuring the surface at the time of masking and the like can be reduced.

According to the present embodiment, because vapor deposition polymerization polyurea is used for both the phosphor protecting layer and the protecting layer, the same effects as those of the first embodiment can be acquired. In addition, because both the protecting layers are made by the polyaddition reaction, it is possible to obtain the phosphor protecting layer in which there is no generation of excessive impurities and the projections by by-products and the like are difficult to produce. Moreover, because the polyurea obtained by the polyaddition reaction is used as the phosphor protecting layer, it becomes possible to prevent the deliquescence of the phosphor layer which has the columnar crystal structure by the dehydration reaction. Moreover, the formation of the phosphor protecting layer in the bonding pad portion can be prevented by heating the bonding pad portion of the sensor panel at the time of vapor deposition polymerization.

In addition, in the present embodiment, polyurea is used as both of the phosphor protecting layer and the protecting layer. However, the present invention is not limited to the material, but the same effects can be acquired by using the two same organic materials selected from the group of combinations of the organic materials such as polyurea, polyimide, polyamide, polyamide-imide, polyazomethine, polyester and polyurethane. However, as the phosphor protecting layer, as described above, the layer acquired by the polyaddition reaction (for example, polyurea, polyurethane and the like) is more preferable than the layer acquired by the condensation polymerization reaction (for example, polyimide, polyamide, polyazomethine, polyester and the like) owing to the existence of the dehydration reaction.

Third Embodiment

Figure 7:
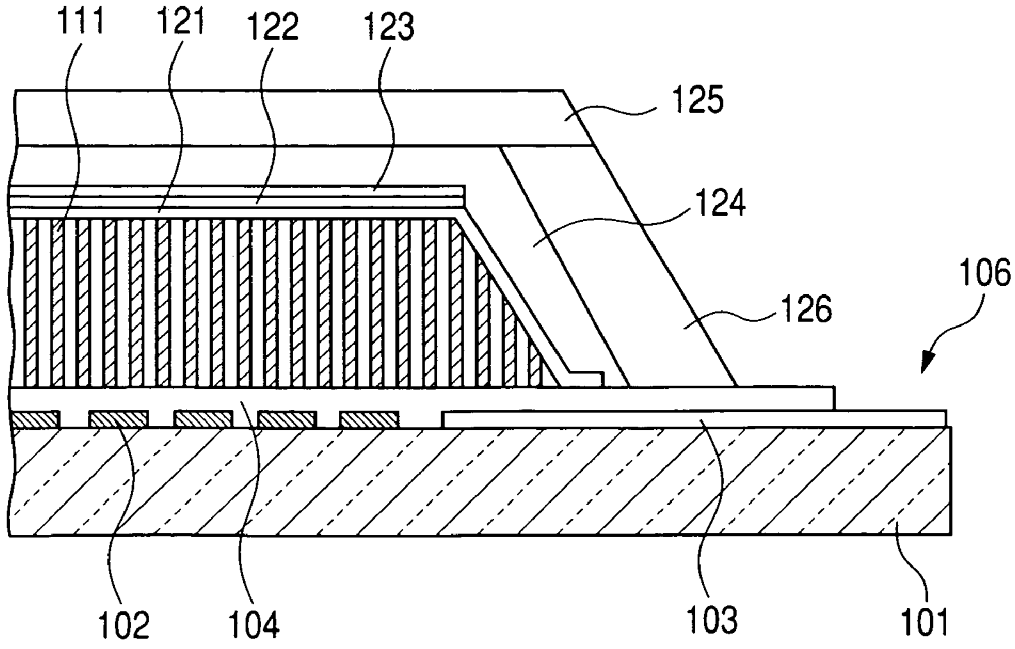
FIG. 7 is a sectional view showing a radiation detecting apparatus according to a third embodiment of the present invention.

FIG. 7 is a sectional view showing a third embodiment. Because the components corresponding to those of the first embodiment are denoted by the same reference numerals as those of the first embodiment, the descriptions pertaining to the same components are omitted.

In a radiation detecting apparatus of the present embodiment, vapor deposition polymerization polyimide is used as a phosphor protecting layer (thin film layer) 121 on the phosphor layer 111 made of CsI:Tl having a columnar crystal structure. Moreover, two layers of reflecting layers 122 and 123 are formed on the phosphor protecting layer 121. A moisture sealing layer 124 made of a silicone potting material is formed around the formed layers, and a radiation transmitting window 125 and a surrounding wall 126, both made of aluminum, are formed at the outermost circumference.

Consequently, also in the present embodiment, because vapor deposition polymerization polyimide is used for the phosphor protecting layer, the same effects as those of the first embodiment can be acquired.

Incidentally, when the phosphor protecting film 121 made of vapor deposition polymerization polyimide is formed to the protecting film 104 of the photoelectric conversion elements 102 as the present embodiment, the moisture sealing layer 124 may be omitted.

In addition, in the present embodiment, polyimide is used as the phosphor protecting layer. However, the present invention is not limited to the material, but the same effects can be acquired by using polyurea, polyamide, polyamide-imide, polyazomethine, polyester and polyurethane in addition to the polyimide. However, as the phosphor protecting layer, as described above, the layer acquired by the polyaddition reaction (for example, polyurea, polyurethane and the like) is more preferable than the layer acquired by the condensation polymerization reaction (for example, polyimide, polyamide, polyazomethine, polyester and the like) owing to the existence of the dehydration reaction.

Fourth Embodiment

Figure 8:
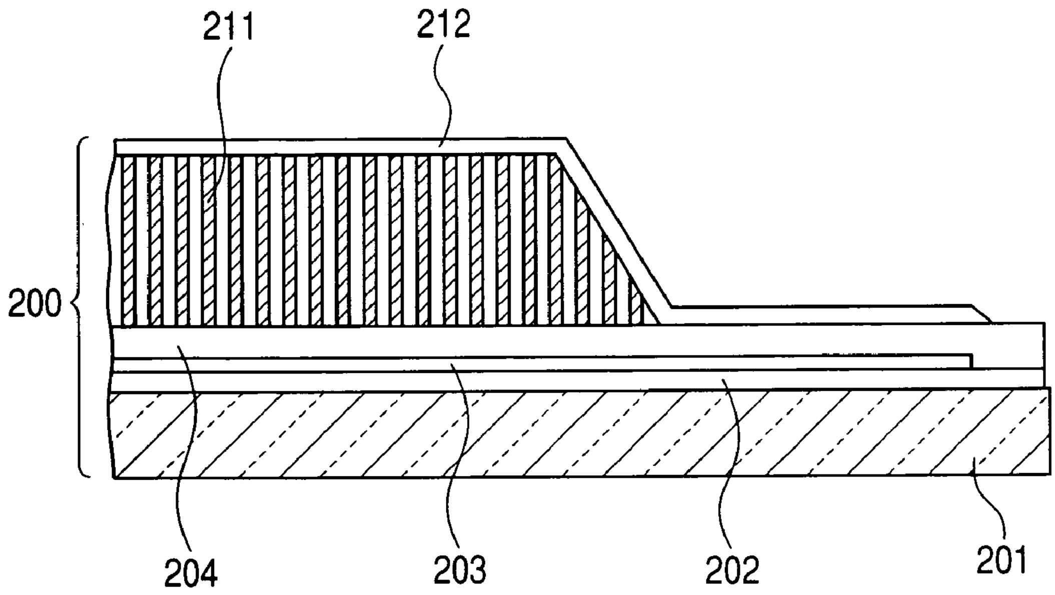
FIG. 8 is a sectional view showing a scintillator of a radiation detecting apparatus according to a fourth embodiment of the present invention.
Figure 9:
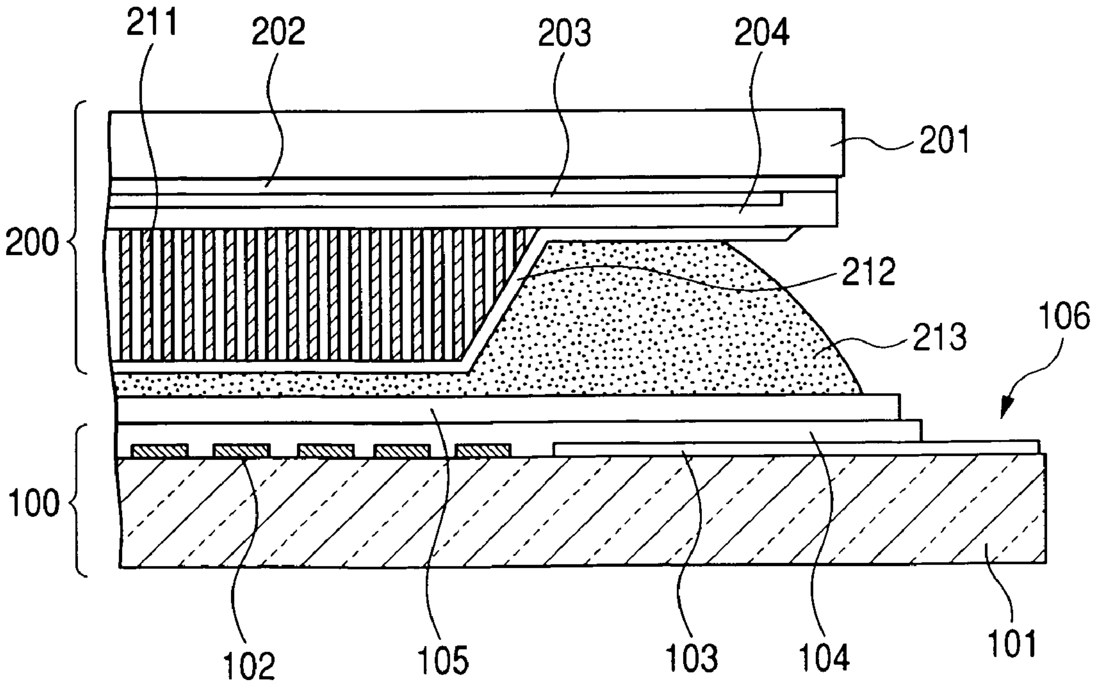
FIG. 9 is a sectional view showing the radiation detecting apparatus according to the fourth embodiment of the present invention.

FIGS. 8 and 9 are sectional views showing a preferable embodiment. Because the components corresponding to those of the first embodiment are denoted by the same reference numerals as those of the first embodiment, the descriptions pertaining to the same components are omitted.

In a radiation detecting apparatus according to the present embodiment, as shown in FIG. 8, a protecting layer 202, a reflecting layer 203 and a phosphor underlying layer (protecting layer) 204 are formed on a supporting substrate 201 made of amorphous carbon. Then, a phosphor layer 211 made of CsI:Tl having a columnar crystal structure is formed on the phosphor underlying layer 204, and vapor deposition polymerization polyurea is formed as a phosphor protecting layer 212. A thus configured scintillator panel 200 is used.

The radiation detecting apparatus is one formed by pasting the scintillator panel 200 and the sensor panel 100 together with each other by a bonding layer 212.

Also in the present embodiment, because vapor deposition polymerization polyurea is used as the phosphor protecting layer, the defects are few, which is a feature of the vapor deposition polymerization organic film. Consequently, it is possible to remove optical artifacts.

In addition, in the present embodiment, polyurea acquired by the vapor deposition polymerization method is used as the phosphor protecting layer. However, the present invention is not limited to the material, but the same effects can be acquired by using polyimide, polyamide, polyamide-imide, polyazomethine, polyester, polyurethane and the like in addition to the polyurea. However, as the phosphor protecting layer, the layer acquired by the polyaddition reaction (for example, polyurea, polyurethane and the like) is more preferable than the layer acquired by the condensation polymerization reaction (for example, polyimide, polyamide, polyazomethine, polyester and the like) owing to the existence of the dehydration reaction.

Fifth Embodiment

Figure 10:
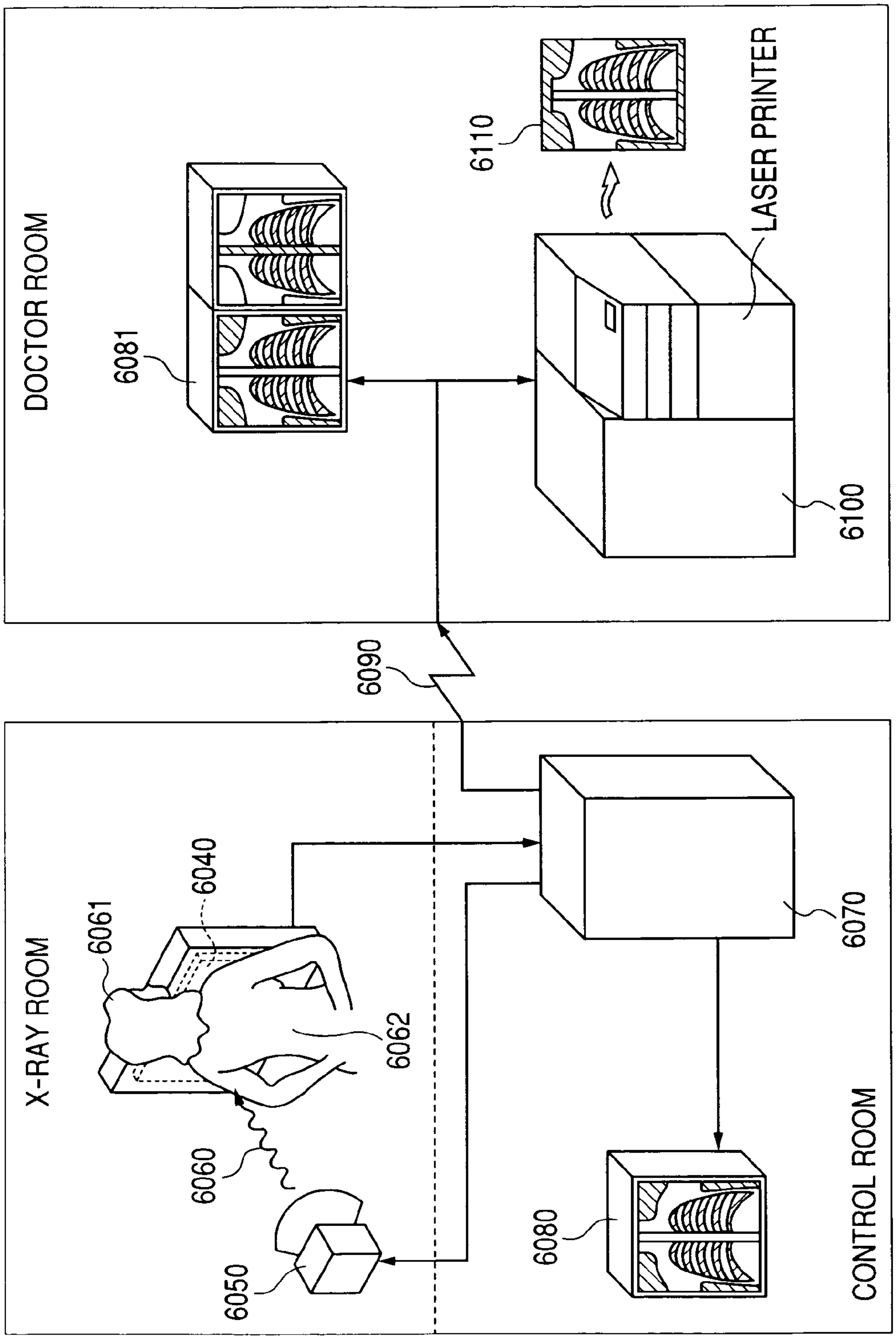
FIG. 10 is a schematic diagram of a radiation detecting system according to a Fifth Embodiment of the present invention.
Figure 11:
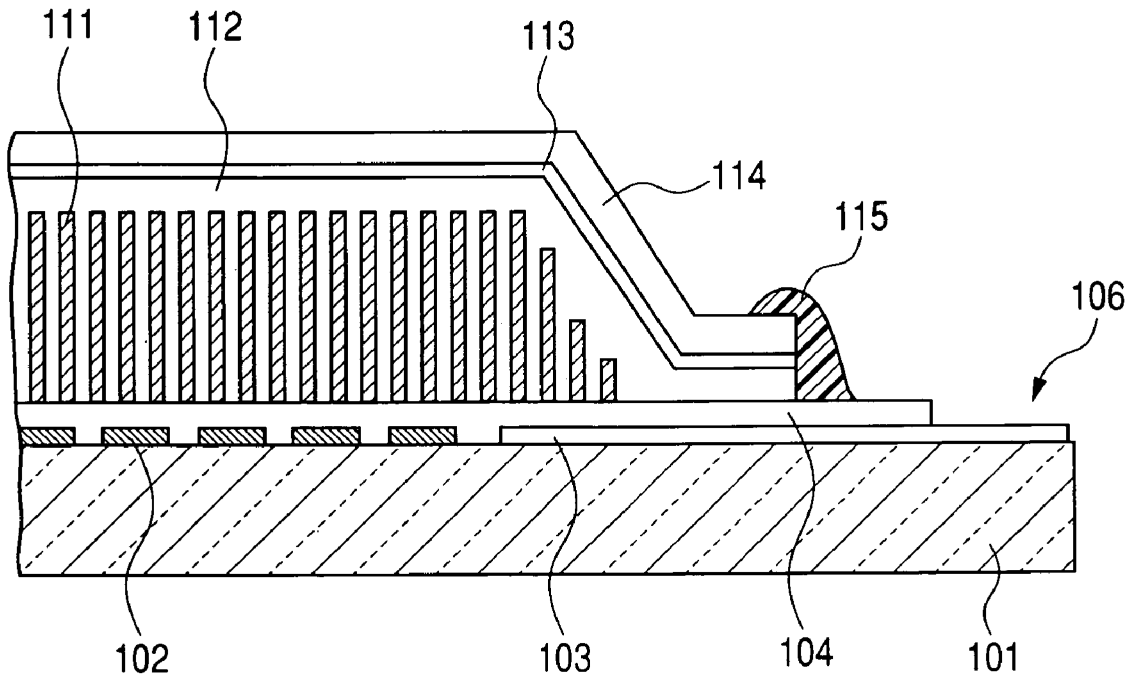
FIG. 11 is a sectional view showing a prior art radiation detecting apparatus.

FIG. 10 is a schematic diagram showing a suitable example of a radiation detecting system according to the present invention. The radiation detecting system shown in FIG. 10 is one using a radiation detecting apparatus according to the present invention.

In the radiation detecting system shown in FIG. 10, an X-ray 6060 generated by an X-ray tube (radiation source) 6050 transmits the chest 6062 of a patient or a subject 6061 to enter a radiation detecting apparatus 6040. The entered X-ray includes the information of the internal portion of the patient 6061. The phosphor of the radiation detecting apparatus 6040 emits light according to the incidence of the X-ray, and the emitted light is photoelectrically converted to be electronic information to be obtained. The information is converted into digital information by image processor 6070 and receives the image processing thereof by the image processor 6070. Then the processed image can be observed with a display (display means) 6080 in a control room.

Moreover, the information can be transmitted to a remote place by transmission means such as a telephone line 6090 and the like, and the information can be displayed on a display 6081 in a doctor room or the like at another place, or the information can be saved in a recording medium such as an optical disc. It is also possible for a doctor at a remote place to perform the diagnosis of the image. Moreover, the image can be recorded on a film 6110 with a film processor 6100.

As described above, the present invention can be applied to a medical X-ray diagnosis apparatus and the like, and the invention is also effective in the case of being applied to nondestructive inspection and the like other than the medical X-ray diagnosis apparatus.

This application claims priority from Japanese Patent Application No. 2004-233420 filed on Aug. 10, 2004, which is hereby incorporated by reference herein.

What is claimed is:

1. A radiation detecting apparatus, comprising:

a sensor panel;

a phosphor layer, formed on said sensor panel, which converts radiation into light; and a phosphor protecting layer covering said phosphor layer to adhere closely to said sensor panel, wherein said phosphor protecting layer is made of an organic film formed by vapor deposition polymerization, wherein said sensor panel includes a substrate, a light receiving unit composed of a plurality of photoelectric conversion elements arranged on said substrate two-dimensionally to convert the light into an electric signal, and a protecting film provided on said light receiving unit to touch said phosphor layer and said phosphor protecting layer, and wherein said phosphor protecting layer is made of an organic film formed of two kinds of reactive groups, and obtained by a polyaddition reaction, said phosphor protecting layer being made of polyurea.

2. A radiation detecting apparatus according to claim 1, further comprising:

a reflecting layer arranged to touch said phosphor protecting layer to reflect the light converted by said phosphor layer, and a protecting layer protecting said reflecting layer.

3. A radiation detecting apparatus according to claim 1, wherein said substrate is a supporting member composed of a supporting substrate, a reflecting layer provided on said supporting substrate to reflect the light converted by said phosphor layer, and a phosphor underlying layer provided on said reflecting layer to touch said reflecting layer and said phosphor protecting layer.

4. A radiation detecting apparatus according to claim 1, wherein said organic film also contains a material selected from the group consisting of polyimide, polyamide, polyamide-imide, polyazomethine, polyurethane and polyester.

5. A radiation detecting apparatus according to claim 1, wherein said phosphor layer has a columnar crystal structure.

6. A radiation detection system, comprising:

a radiation detecting apparatus according to claim 1;

signal processing means for processing a signal from said radiation detecting apparatus;

recording means for recording a signal from said signal processing means;

display means for displaying the signal from said signal processing means;

transmission processing means for transmitting the signal from said signal processing means; and a radiation source for generating radiation.

7. A radiation detecting apparatus according to claim 1, wherein said phosphor layer contains CsI.

8. A radiation detection system according to claim 6, wherein said phosphor layer contains CsI.

9. A radiation detecting apparatus according to claim 1, wherein the polyaddition reaction is performed without a dehydrating reaction.

10. A scintillator panel, comprising:

a supporting member;

a phosphor layer, formed on said supporting member, which converts radiation into light;

a phosphor protecting layer covering said phosphor layer to adhere closely to said supporting member, wherein said phosphor protecting layer is made of an organic film formed by vapor deposition polymerization, and wherein said phosphor protecting layer is made of an organic film formed of two kinds of reactive groups, and made by a polyaddition reaction, said phosphor protecting layer being made of polyurea.

11. A scintillator panel according to claim 10, wherein said supporting member includes a supporting substrate, a reflecting layer provided on said supporting substrate to reflect the light converted by said phosphor layer, and a phosphor underlying layer provided on said reflecting layer to touch said reflecting layer and said phosphor protecting layer.

12. A scintillator panel according to claim 10, wherein said organic film also contains a material selected from the group consisting of polyimide, polyamide, polyamide-imide, polyazomethine, polyurethane and polyester.

13. A scintillator panel according to claim 10, wherein said phosphor layer has a columnar crystal structure.

14. A radiation detecting apparatus according to claim 10, wherein the polyaddition reaction is performed without a dehydrating reaction.

15. A radiation detection apparatus, comprising:

a scintillator panel according to claim 10; and a sensor panel including a substrate and a light receiving unit including a plurality of photoelectric conversion elements arranged on said substrate two-dimensionally to convert the light into an electric signal.

16. A manufacturing method of a radiation detecting apparatus, comprising the step of forming a phosphor protecting layer by a vapor deposition polymerization method to cover a phosphor layer, formed on a sensor panel, which converts radiation into light, and to adhere closely to the sensor panel, wherein the sensor panel includes a substrate, a light receiving unit composed of a plurality of photoelectric conversion elements arranged on the substrate two-dimensionally to convert the light into an electric signal, and a protecting film provided on the light receiving unit to touch the phosphor layer and the phosphor protecting layer, and wherein said step of forming the phosphor protecting layer includes a condensation polymerization reaction or a polymerization reaction on the substrate to two kinds of monomers of a polymeric material, the phosphor protecting layer being made of polyurea.

17. A manufacturing method of a radiation detecting apparatus according to claim 16, wherein said step of forming the phosphor protecting layer is performed while heating a portion where the phosphor protecting layer is not formed with heating means.

18. A manufacturing method of a scintillator panel, comprising the step of forming a phosphor protecting layer by a vapor deposition polymerization method to cover a phosphor layer, formed on a supporting member, which converts radiation into light, and to adhere closely to the supporting member, wherein said step of forming the phosphor protecting layer includes a polymerization reaction on the supporting member to two kinds of polymeric material monomers acquired by a condensation polymerization reaction or a polyaddition reaction, the phosphor protecting layer being made of polyurea.

19. A radiation detecting apparatus according to claim 18, wherein the polyaddition reaction is performed without a dehydrating reaction.

* * * * *